UNITED STATES PATENT OFFICE.

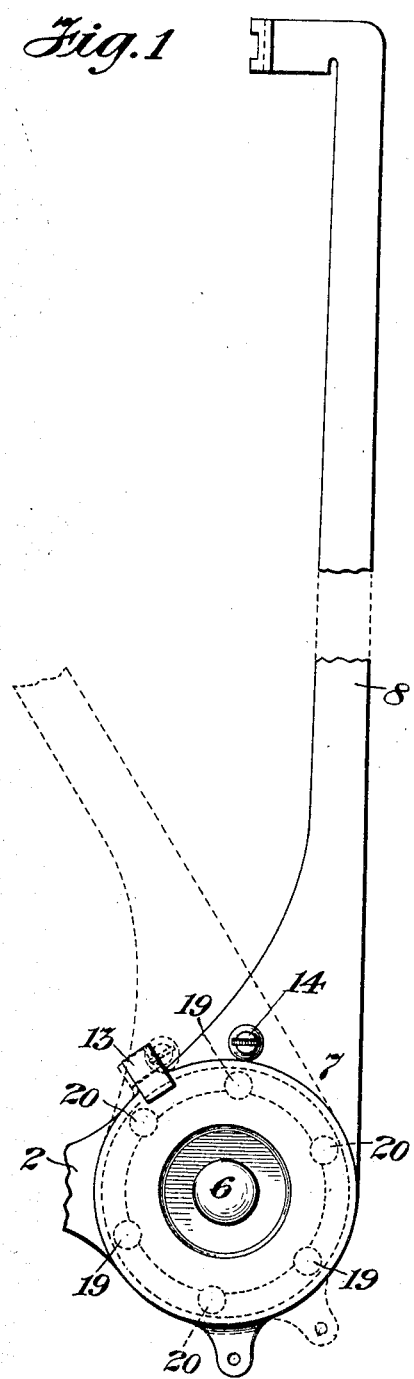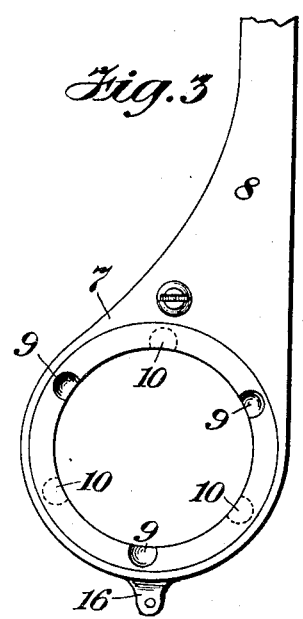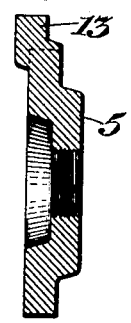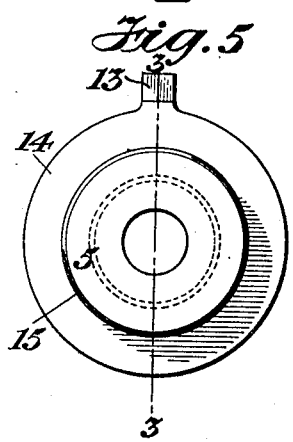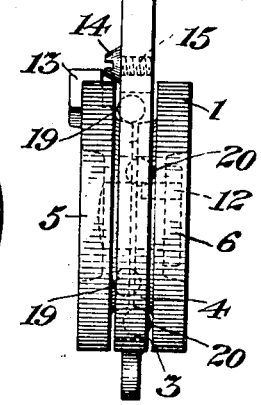

ARTHUR WEBBER CHAMBERLIN, OF NEW YORK, N. Y.

TYPE-BAR AND BEARING THEREFOR.

No. 913,200.      Specification of Letters Patent.      Patented Feb. 23, 1909.

Application filed March 30, 1908. Serial No. 424,211.

*To all whom it may concern:*

Be it known that I, ARTHUR WEBBER CHAMBERLIN, a citizen of the United States, and a resident of New York city, borough of Brooklyn, in the county of Kings and State of New York, have invented certain new and useful Improvements in Type-Bars and Bearings Therefor, of which the following is a specification.

My invention relates to an antifriction bearing for a type bar or similar device requiring accurate alinement, and the principal object is to produce a cheap and efficient bearing adapted to be automatically tightened by movement of the type bar whenever it works loose.

The nature of the invention will be more fully understood from the foregoing description thereof in connection with the accompanying drawings, in which—

Figure 1 is a side elevation, and Fig. 2 a top plan view of the type bar and bearing, Fig. 3 is a detail view showing the portion of the bearing carried by the type bar, Figs. 4 and 5 are detail views of one of the journal members, Fig. 4 being a section on the line 3—3 of Fig. 5.

The stationary member 1 of the bearing is supported by a hanger 2, which is secured to a desired stationary portion of the typewriter. The parts 1 and 2 are preferably of stamped sheet steel, the portion 1 being formed with a protecting wall 3 and a convex pivotal surface 4. A similar, but symmetrically formed bearing member 5, also preferably stamped from sheet steel is provided with a similar side protecting wall 14 and pivotal bearing surface 15. These two members 1 and 5 are secured together by means of a screw 6, so as to form between them an annular groove or depression having parallel annular protecting walls, as well as central pivotal surfaces adapted to engage and support the bearing formed on the end 7 of the type bar 8. If desired, the protecting angular portions 3, 14 may be omitted.

The type bar bearing in 7 is preferably made from hardened steel and formed with cups 9, 9, 9, spaced equidistantly about one side of the inner periphery thereof, and cups 10, 10, 10, on the other side, also equidistant from each other and circumferentially equidistant from the cups 9, 9, 9. All of the cups 9 and 10 are so located as to expose the balls 19, 20 contained therein in bearing relation to the laterally inclined or coned pivotal surfaces 4, 15, of the parts 1, 5.

The type bar 8 with balls of suitable size arranged in the cups 9 on one side and cups 10 on the other, are held in position by the cone 5, which is secured to 1 by means of the screw bolt 6, the end portion of which is screw threaded into cone 5. The shank adjacent the head is accurately fitted into the opening of the cone 1. The locking key 12, driven into a hole bored longitudinally of the screw so as to form an open slot in the periphery thereof, is preferably of soft metal so that it may be hammered and expanded after proper adjustment of the parts has been made, thus locking the screw 6 so as to prevent it from turning with respect to the cone 1. The cone 5 is purposely made capable of rotary movement on the screw thread of 6, so as to permit of the automatic adjustment hereinafter described. The automatic adjustment is effected by means of a lug 13 formed on or projecting from the periphery of the adjusting cone 5. This lug 13 projects radially adjacent the path of movement of the conical head 24 of a screw 25 mounted on one side of the type bar 8.

In operation, the head 24 of the screw 25 will engage the projection 13 on the adjusting cone 5, when the bearing wears enough to permit any side play of the type bar 8. When such side play does occur, the head 24 of the screw 25, by engaging the said projection 13, will turn the adjusting cone 5, which will screw inwardly on the thread of the screw 6 until the bearing is tightened and the side play of the type bar 8 is eliminated. It will be understood that the initial adjustment of the cones and of the screw 6 prior to locking by the soft metal key 12, was initially such as to cause the head of the screw to normally pass by the side of 13, barely grazing the same when the bearing is tight and engaging the same enough to retighten whenever there is any side play of the type bar due to wear. When the head 24 of the screw 25 is cylindrical, instead of conical, it would engage the projection on adjusting cone 5 but once, and the latter would then be moved rearwardly out of reach of the throw of the type bar, because in a typewriter the bar may not move past the printing point, which is at a predetermined, unvarying angle to the normally inoperative position of the type bar. As the head of the screw 14 is conical, however, it will present a new engaging point to the projection on adjusting cone 5 whenever there is enough side play to the type bar 8 to permit such engagement.

The screw 6 which connects the stationary cone 1 with the adjusting cone 5, is threaded and fitted very accurately. It has a broad head in order to resist the downward strain on the bearing when the typewriter key is depressed to lift the type bar.

It will be understood that the projection 16 on the rear end of the type bar bearing is for engagement with the link, whereby it is operatively connected with the typewriter key. If there is any difference in the pull of the link, so that the lateral play of the type bar tends to one side rather than to the other, the screw head 24 and the lug 13 will be located on that side of the bar toward which the bar tends to move when it has any side play. In effecting the final adjustment of the bearing, the screw 6 will be tightened sufficiently to bring the balls 19, 20 into lateral bearing upon the inner walls of cones 1 and 5, and the precise relation of the screw head 24 with respect to the lug 13 may be varied by filing off the engaging portions of either or by screwing in or out the screw 25. In the latter case, I may use washers of different thicknesses, the various sizes differing by say $\frac{1}{1000}$ of an inch, or I may use a yielding washer of spring metal or of yielding materials.

While I have herein fully shown and described, and have pointed out in the appended claims certain novel features of construction, arrangement and operation which characterize my invention, it will be understood by those skilled in the art that various omissions, substitutions, and changes in the forms, proportions, sizes, and details of the device and of its operation, may be made without departing from the spirit of my invention.

I claim:

1. A type bar and a bearing therefor having pivotal and lateral bearing surfaces, in combination with means for tightening said bearing by side play of the type bar, substantially as described.

2. A type bar and a bearing therefor having pivotal and lateral bearing surfaces, in combination with a projection on the type bar adapted to engage a screw threaded member to tighten said bearing when loosened sufficiently to permit of side play of the type bar, substantially as described.

3. A two part cone bearing, in combination with a type bar formed with pockets and provided with balls in said pockets adapted to oppositely engage oppositely converging surfaces of said cone bearing, together with means for tightening said bearing, said means being operated through side play of the type bar when the bearing is loose, substantially as described.

4. A two part cone bearing, in combination with a type bar formed with pockets and provided with balls in said pockets adapted to oppositely engage oppositely converging surfaces of said cone bearing, together with means operated by side play of the type bar for screwing up said bearing when the latter becomes loosened sufficiently to permit such side play of said type bar, substantially as described.

5. A two part bearing comprising a stationary member and a rotatable member having a screw threaded connection therewith, in combination with a type bar pivoted upon said bearing and adapted to coöperate with said rotatable member of said bearing, the location and arrangement of the parts being such that the type bar will engage and screw up said movable bearing whenever there is side play of said type bar, substantially as described.

6. A type bar and bearing adapted to be tightened by movement longitudinally of its axis, in combination with means for tightening said bearing by side play of the type bar.

7. A type bar and bearing adapted to be tightened by movement longitudinally of its axis, in combination with a projection on the type bar adapted to engage a screw threaded member to tighten said bearing when loosened sufficiently to permit side play of the type bar, substantially as described.

8. A type bar and bearing adapted to be tightened by movement longitudinally of its axis, in combination with means for effecting said movement, the parts being relatively proportioned and arranged so that movement of the type bar when loose, operates to tighten said bearing.

Signed at New York city, in the county of New York and State of New York this 26th day of March, A. D. 1908.

ARTHUR WEBBER CHAMBERLIN.

Witnesses:
IRVING M. OBRIEGHT,
ANITA BURKE.